June 9, 1953     W. F. HIGGINS ET AL     2,641,622
ELECTRIC PRIMARY CELL
Filed April 25, 1952
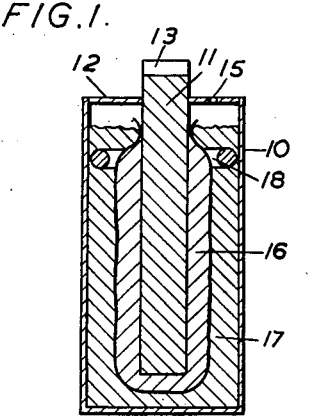
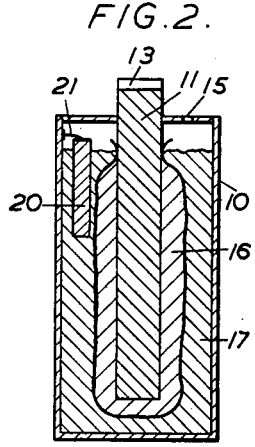
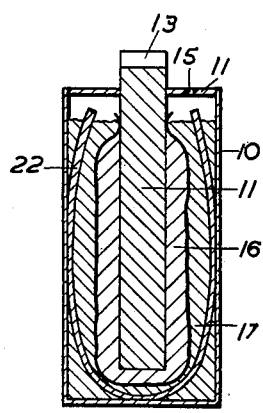
Inventors
W. F. HIGGINS &
R. G. WILKINSON
By
Almon S. Nelson
Attorney Patented June 9, 1953

2,641,622

UNITED STATES PATENT OFFICE 2,641,622

ELECTRIC PRIMARY CELL

William F. Higgins and Robert Geoffrey Wilkinson, Clifton Junction, near Manchester, England, assignors to Magnesium Elektron Limited, Clifton Junction, near Manchester, England Application April 25, 1952, Serial No. 284,264
In Great Britain April 27, 1951

8 Claims. (Cl. 136—120)

This invention relates to electric primary cells of the kind commonly known as "dry cells" having an anode usually in the form of an outer casing which is consumed by the action of the electrolyte when the cell is producing current.

In the construction of "dry cells" it is one practical requirement that the reaction between the anode material and the constituents of the electrolyte which produces current when the cell is in operation, should not take place, or should take place to the smallest possible degree, when the cell is not in use. This freedom from reaction when not required is the factor which results in what is known as a "good shelf life" which implies that when the cell is tested after a period of storage, a large percentage of the original capacity can still be obtained.

In dry cells of the Le Clanche type as commonly provided the anode is zinc and the electrolyte contains ammonium chloride as the chief active electrolyte reagent. In such cells a good shelf life has been achieved usually by having regard to the purity of the materials used and by choice of suitable concentrations of the ingredients. In dry cells in which the anode may be made of magnesium, magnesium base alloys, aluminium, or aluminium base alloys, the achievement of a good shelf life leaves much to be desired and methods are still being sought to achieve improvements in this respect.

We have made experiments which show that the principles of galvanic protection by sacrificial anodes composed of metals or alloys more electro-positive (more anodic) than the metals or alloys of which the normal cell anodes are composed can be applied successfully in such cases to achieve the result desired. The electrochemical relationship between the various metals and alloys is governed chiefly by the nature of the electrolyte in which they are immersed and whatever the metal chosen to form the normal cell anode, and whatever the electrolyte in which that anode is intended to work, it is usually possible to choose another metal or alloy (which however will generally be different in each case) such that the latter is still more electro-positive (more anodic). If this is done and the normal anode and sacrificial anode are coupled together electrically then the cell anode becomes cathodic to the sacrificial anode and the reaction which would normally ensue during storage between the normal anode and the electrolyte will be transferred to the sacrificial anode, which will be corroded according to the usual electrochemical principles and the cell anode will be cathodically protected against corrosion.

It has previously been suggested to attach sacrificial anodes to fuel tanks having steel studs, and to water pipes or other structures buried in the earth or immersed in the sea. In such uses, the object is to prevent or minimise corrosive attack on the tank or other structure at all times. In the case of dry cells however, it is necessary that the zinc casing or like anode shall be readily attacked in the normal way by the action of the electrolyte when the cell is connected for producing current and it is only desired to prevent corrosive attack on this normal anode during periods of storage. The use of a sacrificial anode in a dry cell in accordance with the present invention provides the required protection of the normal anode during storage without interfering with the attack on the normal anode when the cell is producing current and without impeding or diminishing the current or voltage during use.

As examples of the effect above described, we instance the following:

1. It is possible to embed a small piece of magnesium alloy in the electrolyte paste of a normal Le Clanche cell and to connect this to the zinc outer casing. When this is done the zinc becomes cathodic to the magnesium alloy during the time the cell is on open circuit and is protected thereby. When the circuit is closed the zinc is still anodic to the carbon cathode of the cell and its performance is not hindered by the presence of the magnesium attached to it.

2. Where zinc is used in strongly alkaline electrolyte it is possible to adjust the pH of the electrolyte so that aluminium is anodic to the zinc. In such a case a small piece of aluminium connected to the zinc anode will successfully protect the latter during periods of open circuit.

3. Where magnesium alloys which contain small percentages of aluminium or of zinc or of both (such for example as alloys known as "Elektron" (registered trade-mark) AZ31) are used to form the anodes of dry cells, pure magnesium will be found to be anodic to these alloys in most electrolytes and may be used for the purpose proposed.

4. Where magnesium alloys or pure magnesium are used to form the anodes of dry cells, magnesium base alloys containing lithium, calcium or sodium can be used.

5. In certain special cells containing non-aqueous electrolytes still more electropositive metals may be used and in general the more electropositive metal is used as the sacrificial anode to protect a less electropositive one which forms the cell anode. Thus sodium or potassium in certain cases could be used to protect lithium and calcium and lithium and sodium, to protect magnesium.

The sacrificial anode may conveniently be in the form of a small block or rod inserted in the electrolyte within the upper end of the outer metallic casing which is to be protected in firm contact therewith. The sacrificial anode may alternatively consist of a ring or tube fitting tightly within said casing or may consist of a piece of wire bent to a U-shape, semi-circular shape or the like and sprung tightly into the casing.

As a further alternative a blank from which the casing is to be formed by die pressing may consist of the casing metal to one side of which is attached the metal for the sacrificial anode so that when the casing is formed the sacrificial anode constitutes a lining over whole or part of the inner surface of the casing. In some cases such a lining may be provided by rolling, spraying or otherwise.

If desired a vent may be provided for escape of gases which may be generated within the cell.

The cell may otherwise be constructed in the usual manner.

Certain constructional forms of the invention will now be described with reference to the accompanying diagrammatic drawings wherein:

Figure 1 is a vertical sectional view of a primary cell made in accordance with the invention; and Figures 2 and 3 are similar views showing a modified construction.

A casing 10 constitutes a metal anode which is consumed during the normal use of the cell. A carbon rod 11 constitutes the cathode and is mainly disposed within the casing. The cell has a bituminous covering 12 through which the upper end of the carbon rod projects and a brass cap 13 covers the top of the rod. The covering 12 has an escape outlet 15 for gases. A dolly containing a depolariser surrounds the lower part of the carbon rod and an electrolyte paste 17 is filled into the casing around the dolly. A rod or wire 18 is bent into annular or part annular shape and is sprung into the casing so as to have a good electrical contact therewith and is disposed within the electrolyte around the upper end of the dolly.

In the modification shown in Figure 2 a small rod or plate 20 constitutes the sacrificial anode and a wire 21 is connected by welding, soldering or otherwise to the anode 20 and to the casing 10.

In the construction shown in Figure 3 the sacrificial anode is in the form of a wire or bar 22 which is bent to U-shape and sprung into the casing 10 so as to have good electrical contact therewith and in the finished cell the lower end of the bar 22 is below the dolly while the upper ends are adjacent the top of the electrolyte.

We claim:
1. An electric dry cell having a consumable metal anode, a cathode, an electrolyte, and a sacrificial anode made of a metal or alloy more electropositive than the said metal anode, the sacrificial anode allowing the metal anode to be consumed during normal use of the cell but minimising the corrosion of the metal anode during periods when the cell is not in use.

2. An electric dry cell as claimed in claim 1 wherein the metal anode is zinc and the sacrificial anode is magnesium or magnesium base alloy.

3. An electric dry cell as claimed in claim 1, comprising a zinc casing constituting the metal anode, a carbon rod located partly within the casing, a depolariser dolly surrounding the lower part of the carbon rod, an electrolyte surrounding the dolly, a covering substance over the zinc casing through which the upper end of the carbon rod projects, and a piece of magnesium or magnesium alloy in the electrolyte constituting said sacrificial anode and contacting the casing.

4. A cell as claimed in claim 3 wherein the sacrificial anode is annular or part annular in shape and located around the upper end of the dolly.

5. A cell as claimed in claim 3 wherein the sacrificial anode is connected to the casing by a wire.

6. A cell as claimed in claim 3 wherein the sacrificial anode is in the form of a U-shaped wire sprung into the casing with its lower end below the dolly.

7. A cell as claimed in claim 1 wherein the metal anode is a magnesium base alloy and the sacrificial anode is pure magnesium.

8. A cell as claimed in claim 1 wherein the metal anode is pure magnesium and the sacrificial anode is a magnesium base alloy containing at least one metal selected from the group consisting of lithium, calcium and sodium.

WILLIAM F. HIGGINS.
ROBERT GEOFFREY WILKINSON.

References Cited in the file of this patent
UNITED STATES PATENTS

| Number | Name | Date |
|---|---|---|
| 1,856,386 | Heise | May 3, 1932 |

OTHER REFERENCES

National Battery Co. Report On "The Theoretical Power Output of Storage Batteries," 1947, page 5.